(12) United States Patent
Gretz

(10) Patent No.: US 8,091,721 B1
(45) Date of Patent: Jan. 10, 2012

(54) RECONFIGURABLE ELECTRICAL BOX HANGER ASSEMBLY FOR SUSPENDED CEILINGS

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 157 days.

(21) Appl. No.: 12/799,272

(22) Filed: Apr. 21, 2010

(51) Int. Cl.
*H02G 3/08* (2006.01)
*E04G 25/00* (2006.01)

(52) U.S. Cl. .................................. 220/3.9; 248/200.1

(58) Field of Classification Search .................. 220/3.2, 220/3.6, 3.7, 3.9; 248/200.1, 343, 906
See application file for complete search history.

(56) References Cited

U.S. PATENT DOCUMENTS

| | | | |
|---|---|---|---|
| 5,435,514 A * | 7/1995 | Kerr, Jr. ....................... | 248/343 |
| 5,720,461 A | 2/1998 | Kerr, Jr. | |
| 6,345,800 B1 * | 2/2002 | Herst et al. ................... | 248/342 |
| 6,491,270 B1 | 12/2002 | Pfaller | |
| 6,889,943 B2 | 5/2005 | Dinh et al. | |
| 7,216,838 B1 | 5/2007 | Gretz | |
| 7,654,495 B2 | 2/2010 | Adrian et al. | |
| 7,735,794 B1 * | 6/2010 | Gretz ............................ | 248/343 |
| 7,857,275 B2 * | 12/2010 | de la Borbolla .............. | 248/342 |

\* cited by examiner

*Primary Examiner* — Harry Grosso

(57) ABSTRACT

A reconfigurable electrical box hanger assembly for mounting a lighting or fan fixture to the grid supporting structure of a drop ceiling. The hanger assembly includes a one-piece elongated bar, two end pieces with widely spaced support legs, a turnbuckle, and a center bracket supporting an electrical box. The turnbuckle and end pieces are rotatable with respect to the elongated bar, thereby enabling two configurations of the hanger assembly including a compact profile for storage and shipping and an expanded profile for installation on a suspended ceiling. A locking arrangement includes bendable tabs which lock the end pieces with respect to the elongated bar thereby placing the hanger assembly into the expanded profile for installation on a suspended ceiling.

20 Claims, 9 Drawing Sheets

RECONFIGURABLE ELECTRICAL BOX HANGER ASSEMBLY FOR SUSPENDED CEILINGS

FIELD OF THE INVENTION

This invention relates to electrical box hanger assemblies for suspended ceilings and specifically to a load bearing hanger assembly that has the flexibility to be reconfigured from a shipping and storage profile to an operational profile as necessary.

BACKGROUND OF THE INVENTION

Electrical box hanger assemblies are commonly used for supporting lighting or fan fixtures from suspended or drop ceilings. The hanger assemblies typically include a hanger bar of sufficient length to span between the T-rail supports of the suspended ceiling, which is typically a distance of two feet. The hanger assemblies also typically include electrical boxes and end plates that extend a significant distance laterally from the hanger bar, making the hanger bar assembly very bulky.

Many electrical installation and wiring tasks around the home are now done by the homeowner. Thus, hanger assemblies for electrical boxes are typically marketed and sold by suppliers directly to homeowners through retail establishments such as hardware stores. As they are marketing directly to the homeowner, retailers prefer placing the hanger assemblies in packaging that catches the consumer's eye but also that minimizes shelf space as much as possible. Thus, for displaying a bulky item such as an electrical box hanger assembly, the more the overall profile of the hanger assembly can be reduced, the easier the retailer will be able to find shelf space for the assembly. Reducing the overall profile of the hanger assembly also leads to significant advantages in storing and shipping also benefits the manufacturer.

Thus, in regard to electrical box hanger assemblies in today's marketplace, one common desire of the manufacturer and retailer is an ability to reduce the overall profile of the hanger assembly for storage, shipping, and shelf display. It is thus an objective of the present invention to provide a reconfigurable electrical box hanger assembly for a suspended ceiling that can be configured to a compact profile for shipping and storage and to an expanded profile for mounting a lighting or fan fixture to the grid supporting structure of a drop ceiling.

SUMMARY OF THE INVENTION

The invention is a reconfigurable electrical box hanger assembly for mounting a lighting or fan fixture to the grid supporting structure of a drop ceiling. The hanger assembly includes a one-piece elongated bar, two end pieces with widely spaced support legs, a turnbuckle, and a center bracket supporting an electrical box. The turnbuckle and end pieces are rotatable with respect to the elongated bar, thereby enabling two configurations of the hanger assembly including a compact profile for storage and shipping and an expanded profile for installation on a suspended ceiling. A locking arrangement includes bendable tabs which lock the end pieces with respect to the elongated bar thereby placing the hanger assembly into the expanded profile for installation on a suspended ceiling.

OBJECTS AND ADVANTAGES

Several advantages are achieved with the electrical box hanger assembly of the present invention, including:

(1) The hanger assembly can be reconfigured from a compact profile to an expanded profile as desired to meet shipping and storage requirements or for installation requirements.
(2) The hanger assembly is an assembly of components that can be manufactured at low cost as many of the parts, including the bar, end pieces, and center bracket may be economically stamped and shaped from sheet metal.
(3) Ample clearance is provided between the arms and end plate of each end bracket. This enables rapid placement and mounting of the electrical box hanger assembly over the bulb portions of adjacent T-rails in a drop ceiling.
(4) Many portions of the hanger assembly can be folded against the elongated bar in order to reduce the overall transverse profile of the hanger assembly, including the end pieces and the turnbuckle.
(5) A locking arrangement on the hanger assembly positively locks the end pieces to the elongated bar in the expanded configuration.

These and other objects and advantages of the present invention will be better understood by reading the following description along with reference to the drawings.

INDEX TO REFERENCE NUMERALS IN DRAWINGS

Figure 1:
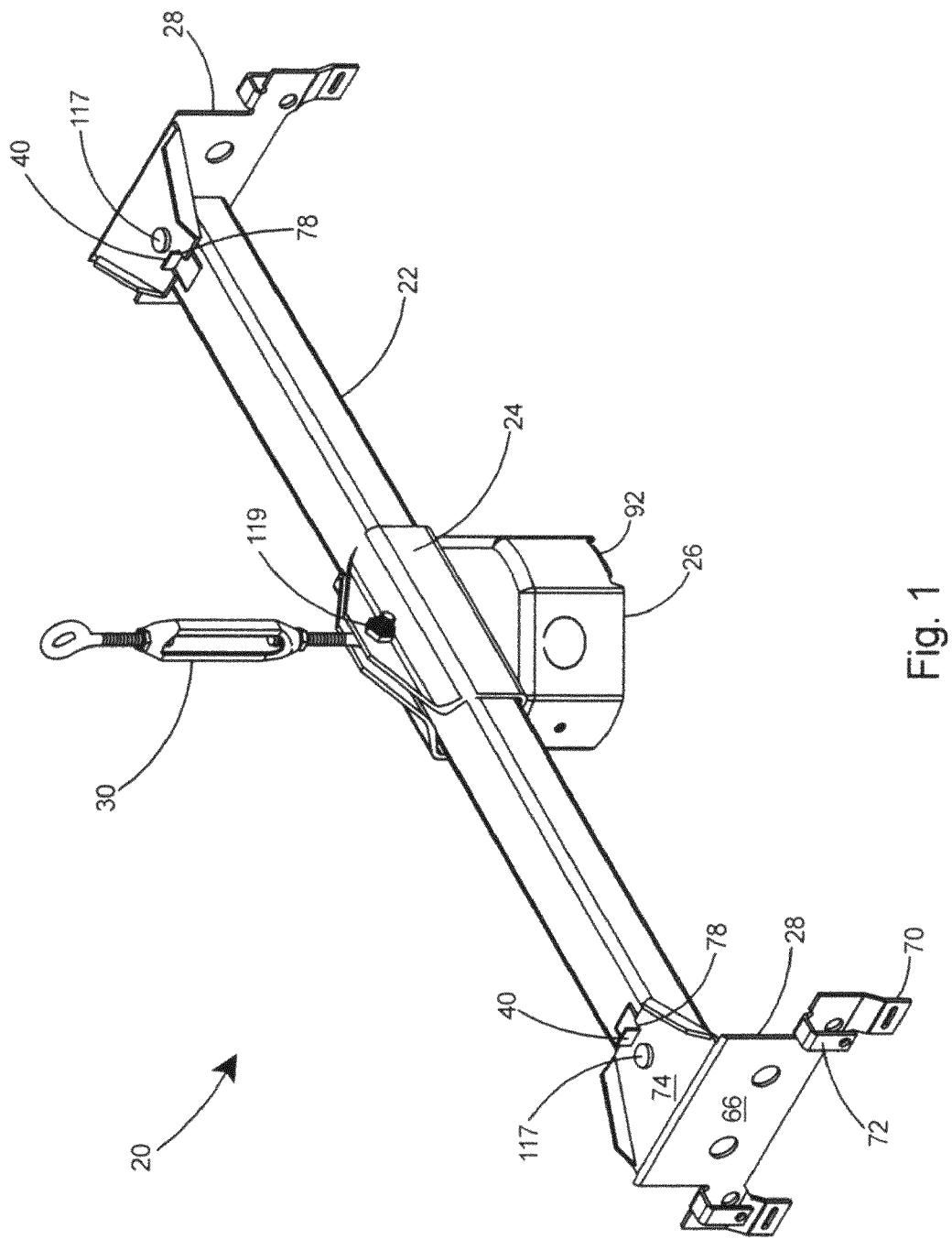
FIG. 1 is a perspective view of a preferred embodiment of a hanger assembly for supporting a lighting or fan fixture on a suspended ceiling according to the present invention.

The following is a listing of part numbers used in the drawings along with a brief description:

| Part Number | Description |
|---|---|
| 20 | electrical box hanger assembly |
| 22 | one-piece elongated bar |
| 24 | center bracket |
| 26 | electrical box |
| 28 | end piece |
| 30 | turnbuckle |
| 32 | top wall of bar |
| 34 | side wall of bar |
| 36 | parallel lips |
| 38 | longitudinal slot |
| 39 | channel of elongated bar |
| 40 | bendable locking tab |
| 41 | U-shaped opening |
| 42 | aperture |
| 44 | end of bar |
| 46 | bottom portion of center bracket |
| 48 | bottom wall |
| 50 | side wall |
| 52 | top wall |
| 54 | central channel |
| 56 | wing |
| 58 | gap between wings |
| 60 | aperture in wings |
| 62 | threaded inner bore in center bracket |
| 64 | smooth outer bore in center bracket |
| 66 | end plate portion of end piece |
| 68 | end of end plate |
| 70 | leg |
| 72 | arm |
| 74 | top plate |
| 76 | flange |
| 78 | notch in top plate |
| 80 | aperture in top plate |
| 82 | bore in end plate |
| 84 | bore in arm |
| 86 | back wall of electrical box |
| 88 | sidewall of electrical box |
| 90 | knockout |
| 92 | mounting fastener storage tab |
| 94 | threaded bore |
| 96 | opening |
| 98 | lug |
| 101 | rivet |
| 103 | fitting |
| 105 | flexible jaw |
| 107 | mounting fastener |
| 108 | threaded bores in lugs |
| 109 | positioning fastener |
| 110 | electrical box fastener |
| 111 | bracket back plate |
| 113 | smooth inner bores in back plate |
| 115 | threaded outer bores in back plate |
| 117 | rivet |
| 119 | turnbuckle fastener |
| 121 | compact configuration |
| 123 | expanded configuration |
| 129 | T-rail |
| 131 | horizontal flange of T-rail |
| 133 | outwardly bent bottom portion of end piece leg |
| 135 | chain |

DETAILED DESCRIPTION OF THE INVENTION

The present invention comprises an electrical box hanger assembly for supporting a lighting or fan fixture on a drop ceiling. Referring to FIG. 1, a preferred embodiment of the hanger assembly 20 includes a one-piece elongated bar 22, a center bracket 24, an electrical box 26, two end pieces 28, and a turnbuckle 30.

Figure 2:
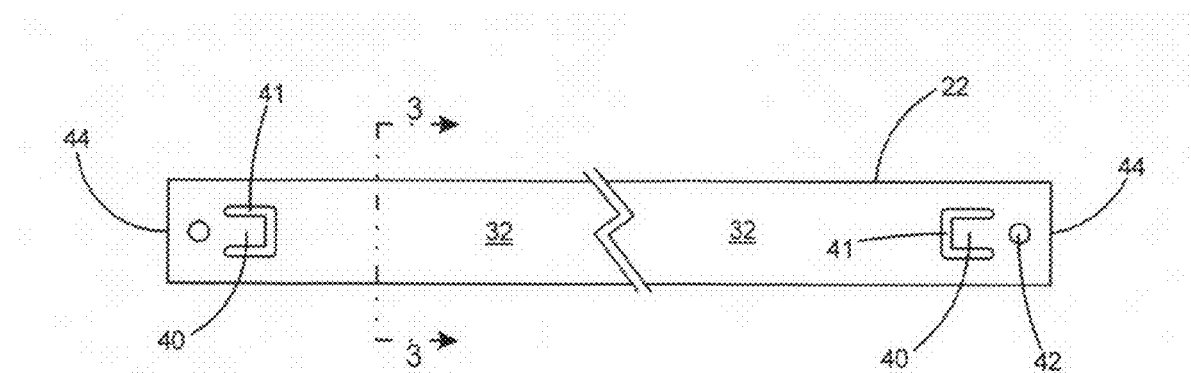
FIG. 2 is a top view of an elongated bar, broken away at the middle, that forms a portion of the hanger assembly depicted in FIG. 1.
Figure 3:
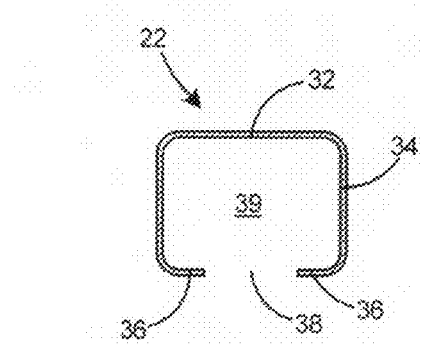
FIG. 3 is a sectional view of the elongated bar taken along line 3-3 of FIG. 2.
Figure 5:
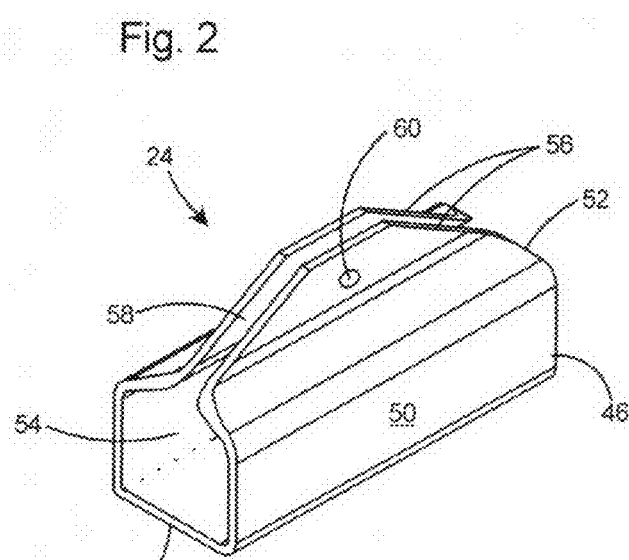
FIG. 5 is a bottom view of the center bracket of FIG. 4.
Figure 4:
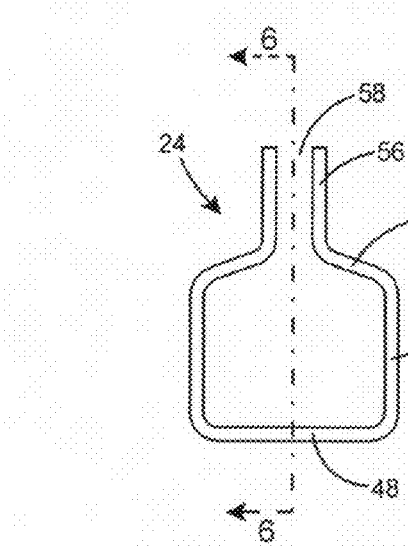
FIG. 4 is an end view of a center bracket that forms a portion of the hanger assembly of FIG. 1.
Figure 6:
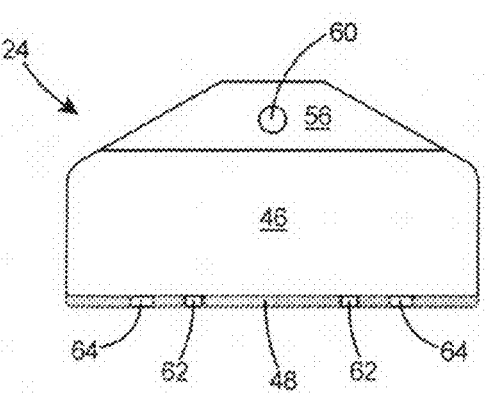
FIG. 6 is a sectional view of the center bracket taken along line 6-6 of FIG. 4.

With reference to FIGS. 2-3, the elongated bar 22 is includes a top wall 32, side walls 34, parallel lips 36 defined by a longitudinal slot 38 extending along the bottom side of the bar 22, and a channel 39 therein. A bendable locking tab 40, defined by U-shaped openings 41 in top wall 32, and an aperture 42 are provided near each end 44 of the elongated bar 22. U-shaped openings 41 provide open area around each bendable locking tab 40 thereby enabling an installer to grab the locking tab 40 more easily and also enable the tabs 40 to move more freely into the locked position as the U-shaped openings 41 eliminate any obstruction or friction from contact with the surrounding top wall 32 of the elongated bar 22.

to FIGS. 4-6, the center bracket 24 includes a substantially tubular bottom portion 46 with a bottom wall 48, side walls 50, and top walls 52 defining a central channel 54. Two wings 56 extending from the top walls 52 of the center bracket 24 include a gap 58 there between and an aperture 60 therein. The bottom wall 48 of the center bracket 24 includes a set or pair of threaded inner bores 62 and a set or pair of smooth outer bores 64 therein.

Now referring to FIGS. 9-12, each end piece 28 includes a planar end plate 66 with two ends 68, a leg 70 extending from each end 68 of the end plate 66, an arm 72 extending from the top of each leg 70, and a top plate 74. The top plate 74 includes two flanges 76 extending there from, a notch 78, and an aperture 80 therein. A bore 82 is provided in each leg 70 and a bore 84 is provided in each arm 72. The bores 82 in each leg 70 are coaxial with the bores 84 in each arm 72.

Figure 16:
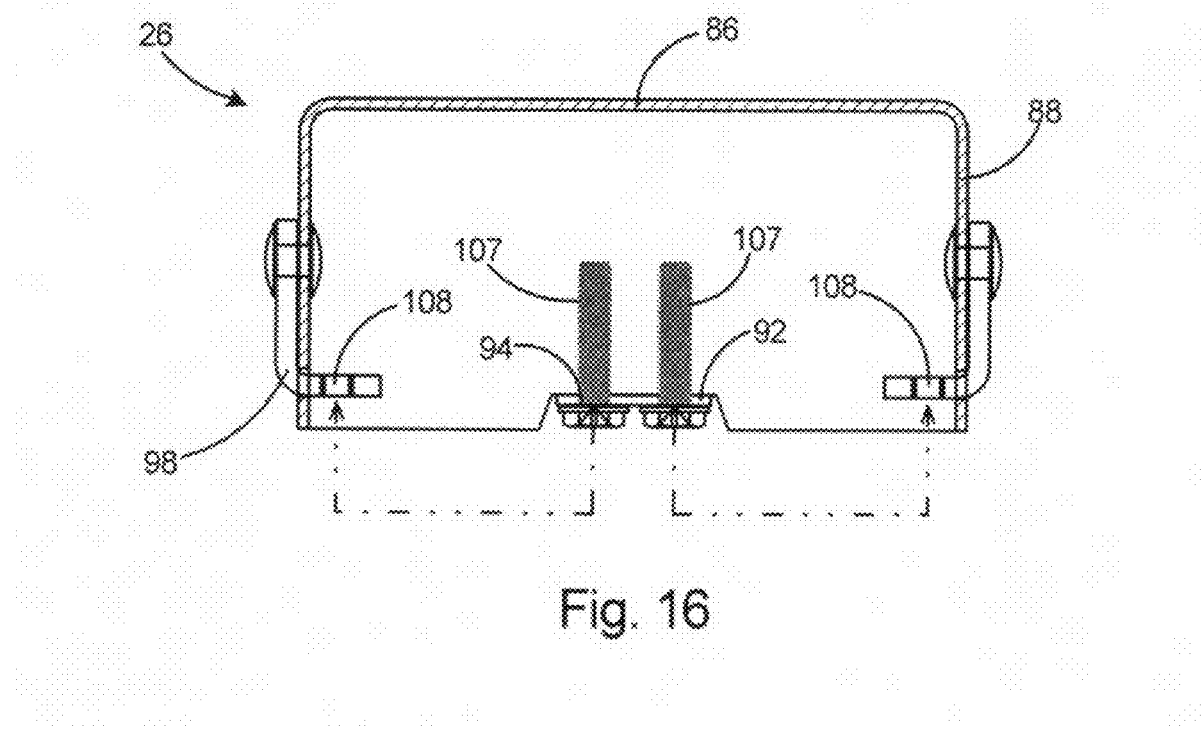
FIG. 16 is a sectional view of the electrical box taken along line 16-16 of FIG. 14.

With reference to FIGS. 13-16, the electrical box 26 includes a back wall 86, sidewalls 88, a plurality of knockouts 90 in the sidewalls 88 and the back wall 86, a fastener storage tab 92 with two threaded bores 94 therein, openings 96 in the sidewalls 88 and two lugs 98 secured to the sidewalls 88 by rivets 101. The fastener storage tab 92 is a bent-over portion of the electrical box sidewall 88. The knockouts 90 in the back wall 86 and the sidewalls 88 enables the use of quick-connect electrical fittings or connectors such as the BLACK BUTTON® push-in connector or fitting 103 for connecting non-metallic cable to the electrical box 26. The BLACK BUTTON® push-in connector, available from Arlington Industries of Scranton, Pa., is simply pushed into one of the knockouts 90 provided in the back wall 86 or sidewalls 88. The flexible jaws 105 on the electrical fitting 103 will grip and firmly hold any NM electrical cable (not shown) that is inserted therein. As shown in FIG. 16, mounting fasteners 107 for securing a lighting fixture or overhead fan (not shown) to the electrical box 26 are provided with the hanger assembly and are held in the threaded bores 94 in the fastener storage tab 92. Thus the hanger assembly will include all the hardware required to secure an electrical device to the suspended ceiling. The lugs 98 include threaded bores 108 therein for receipt of mounting fasteners 107. In operation, when a lighting fixture or electrical fan are secured to the electrical box 26, mounting fasteners 107, which are conveniently provided with the hanger assembly and held therein in the threaded bores 94 of fastener storage tab 92, are moved from the fastener storage tab 92 through the mounting base of the lighting fixture or electrical fan (not shown) and secured into threaded bores 108 of lugs 98 to secure the electrical component to the hanger assembly.

Figures 7, 8:
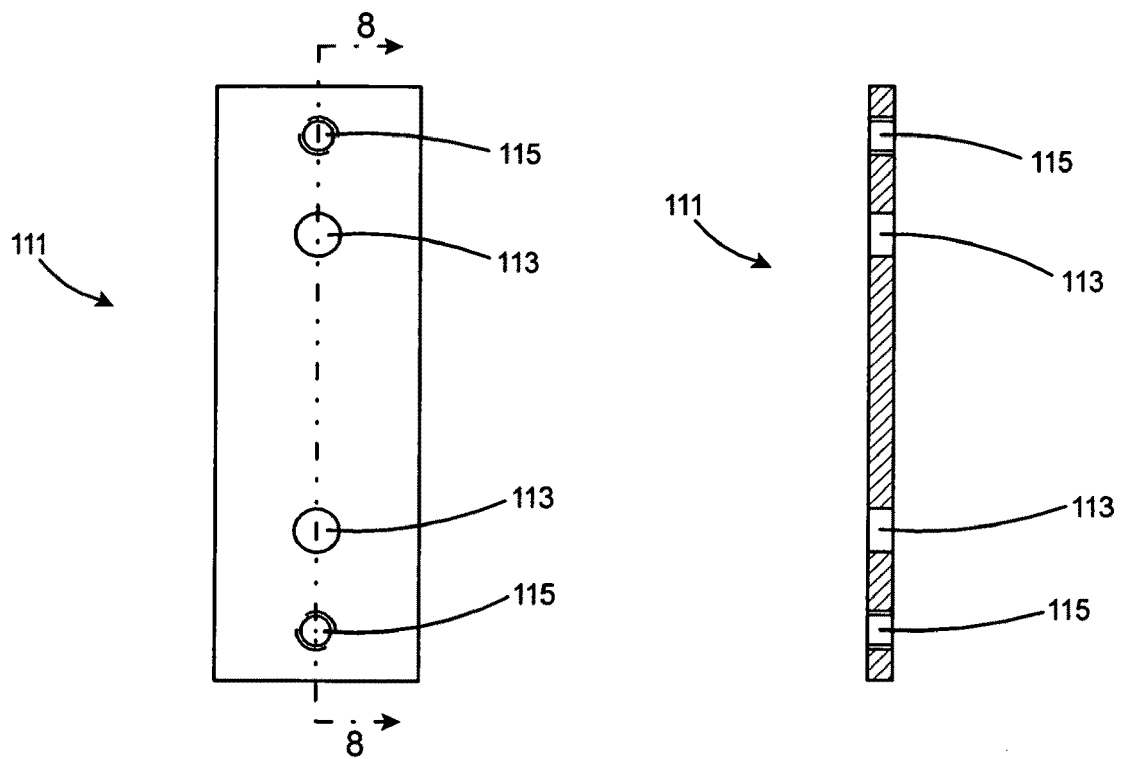
FIG. 7 is a plan view of a bracket back plate that forms a portion of the hanger assembly of FIG. 1.
FIG. 8 is a sectional view of the back plate taken along line 8-8 of FIG. 7.
Figure 9:
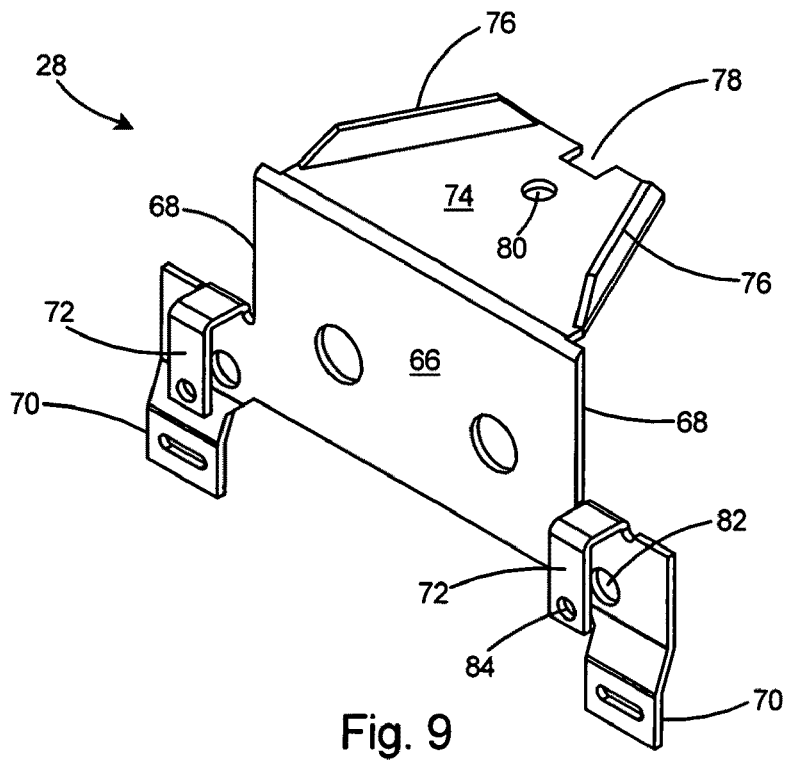
FIG. 9 is a perspective view of one of the end pieces that forms a portion of the hanger assembly of FIG. 1.
Figure 10:
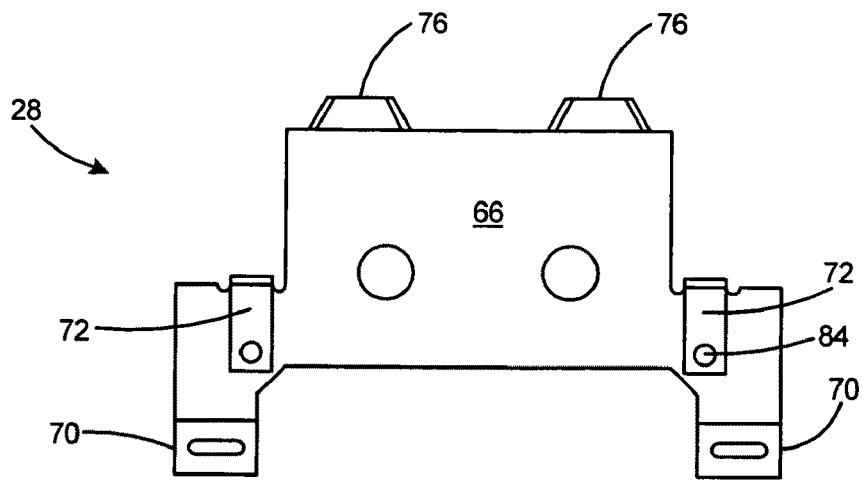
FIG. 10 is an end view of the end piece depicted in FIG. 9.
Figure 11:
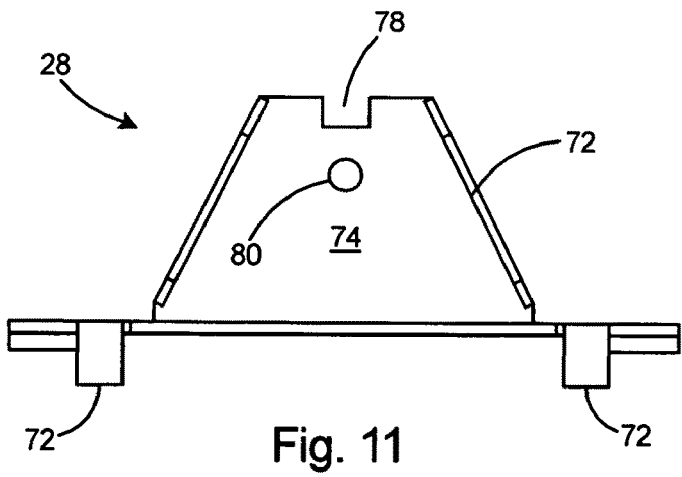
FIG. 11 is a top view of the end piece.
Figure 12:
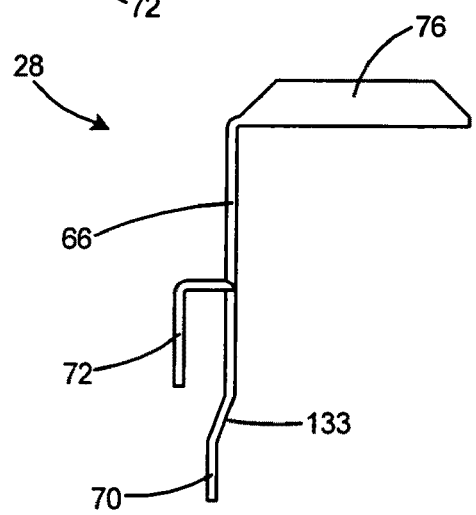
FIG. 12 is a side view of the end piece as viewed from the left side of FIG. 10.
Figure 13:
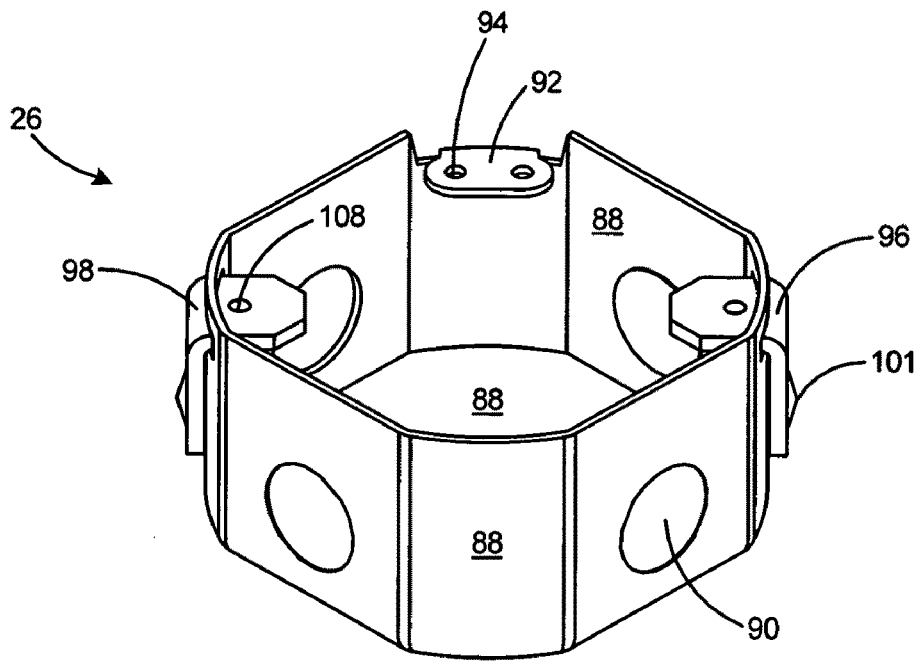
FIG. 13 is a perspective view of an electrical box that forms a portion of the hanger assembly of FIG. 1.
Figure 14:
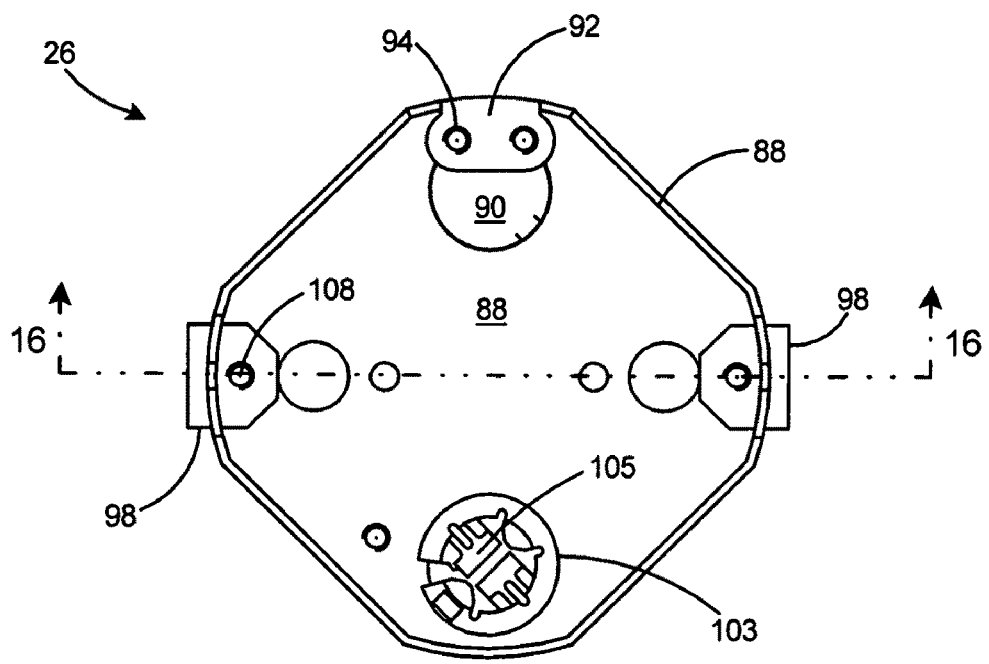
FIG. 14 is a view of the electrical box of FIG. 13 from the open end.
Figure 15:
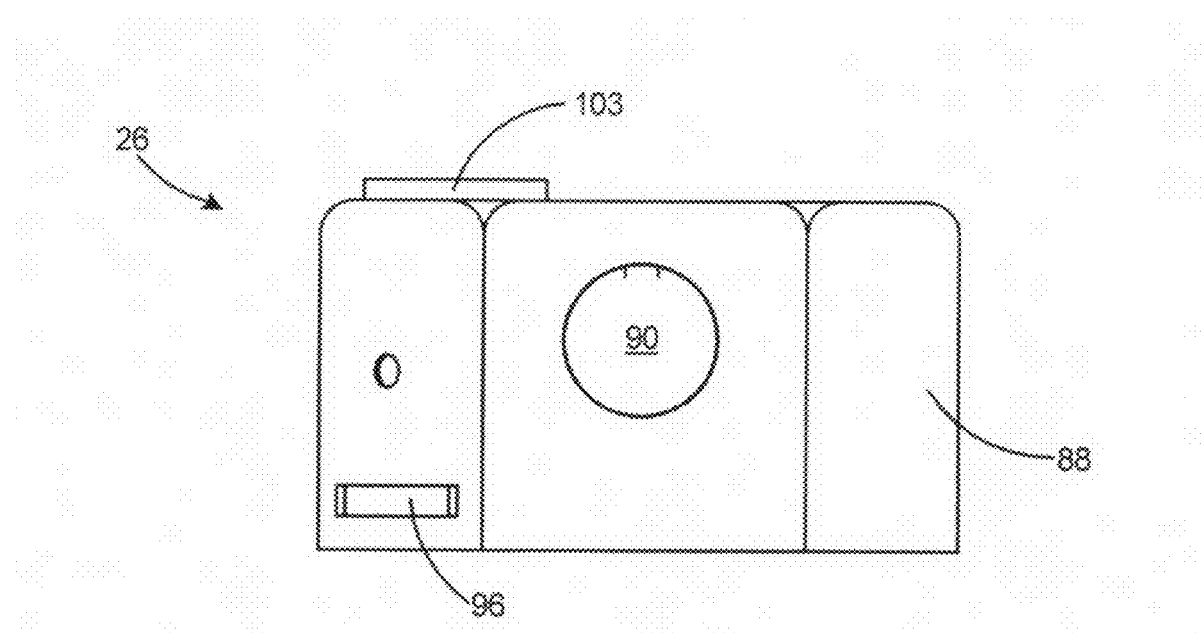
FIG. 15 is a side view of the electrical box.
Figure 17:
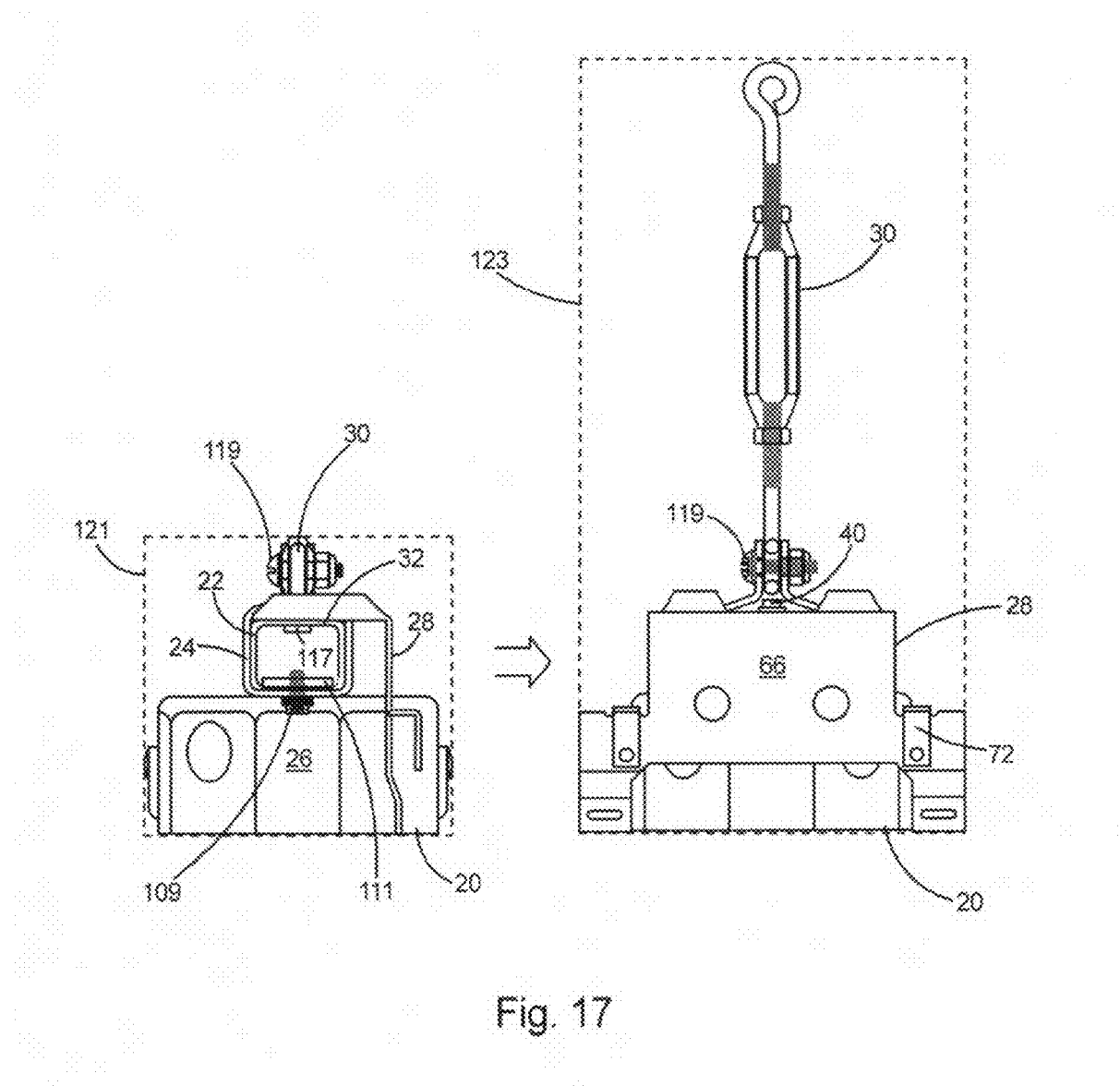
FIG. 17 is an end view of the hanger assembly of the present invention in two configurations including a compact configuration on the left of the figure and an expanded configuration on the right of the figure.
Figure 18:
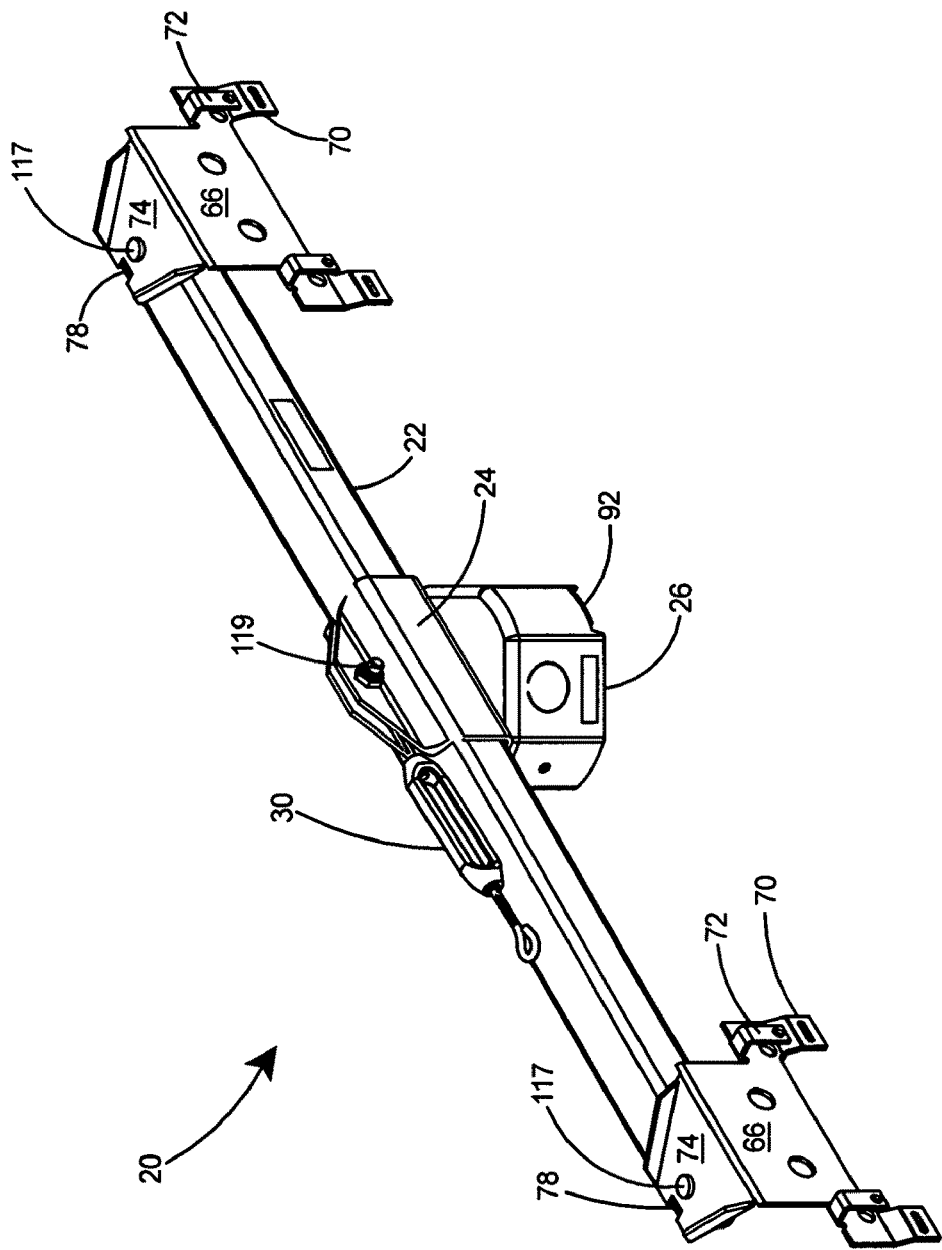
FIG. 18 is a perspective view of the preferred embodiment of the hanger assembly in the compact configuration, with the end pieces folded against the sides of the elongated bar and the turnbuckle folded against the top of the elongated bar.

With reference to FIG. 17, there is shown on the left hand side of the figure the hanger assembly 20 of the present invention in a compact configuration. As shown in the cut-away portion, electrical box 26 and center bracket 24 are held secure to elongated bar 22 by positioning fasteners 109 secured into threaded bores in a bracket back plate 111. Bracket back plate 111, as shown in FIGS. 7-8, includes a pair of smooth inner bores 113 and a pair of threaded outer bores 115 therein. Referring again to FIG. 17, end pieces 28 are secured to elongated bar 22 by rivets 117. The hanger assembly 20 is placed in the compact configuration by rotating both end pieces 28 to the same side of the assembly and rotating turnbuckle 30 around fastener 119 until it is flush against the top wall 32 of bar 22. Thus the hanger assembly 20 achieves a compact configuration 121 as shown by phantom lines and the elongated assembly can fit in a box or package of substantially small height and width. The folded or compact configuration is also shown in perspective view in FIG. 18.

Upon removal from the package, the hanger assembly 20 can be folded into the expanded configuration shown on the right side of FIG. 17. Each end piece 28 is folded until end plate 66 is orthogonal to the longitudinal axis of the elongated bar 22 and turnbuckle 30 is folded until the elongated turnbuckle 30 is substantially orthogonal to the bar 22. Thus, for installation at the job site, the hanger assembly 20 is placed in an expanded configuration 123 as shown by phantom lines on the right side of FIG. 17. As shown in FIG. 1, which depicts the hanger assembly 20 in the expanded configuration, when end pieces 28 are folded orthogonal to the bar 22, notches 78 on end pieces 28 are in alignment with bendable locking tabs 40 of the elongated bar. The end pieces 28 are locked in the expanded configuration by bending locking tabs 40 of elongated bar 22 upward into the notch 78 in the top plate 74 portion of the end piece 28. As shown in FIG. 17, a comparison of phantom lines for the compact configuration 121 and phantom lines for the expanded configuration 123 show the substantial advantage provided by the present invention as a significant reduction can be made in the overall profile of the hanger assembly thereby reducing storage space, the size of the packaging, and the amount of shelf space per unit required at the retailer.

Figure 19:
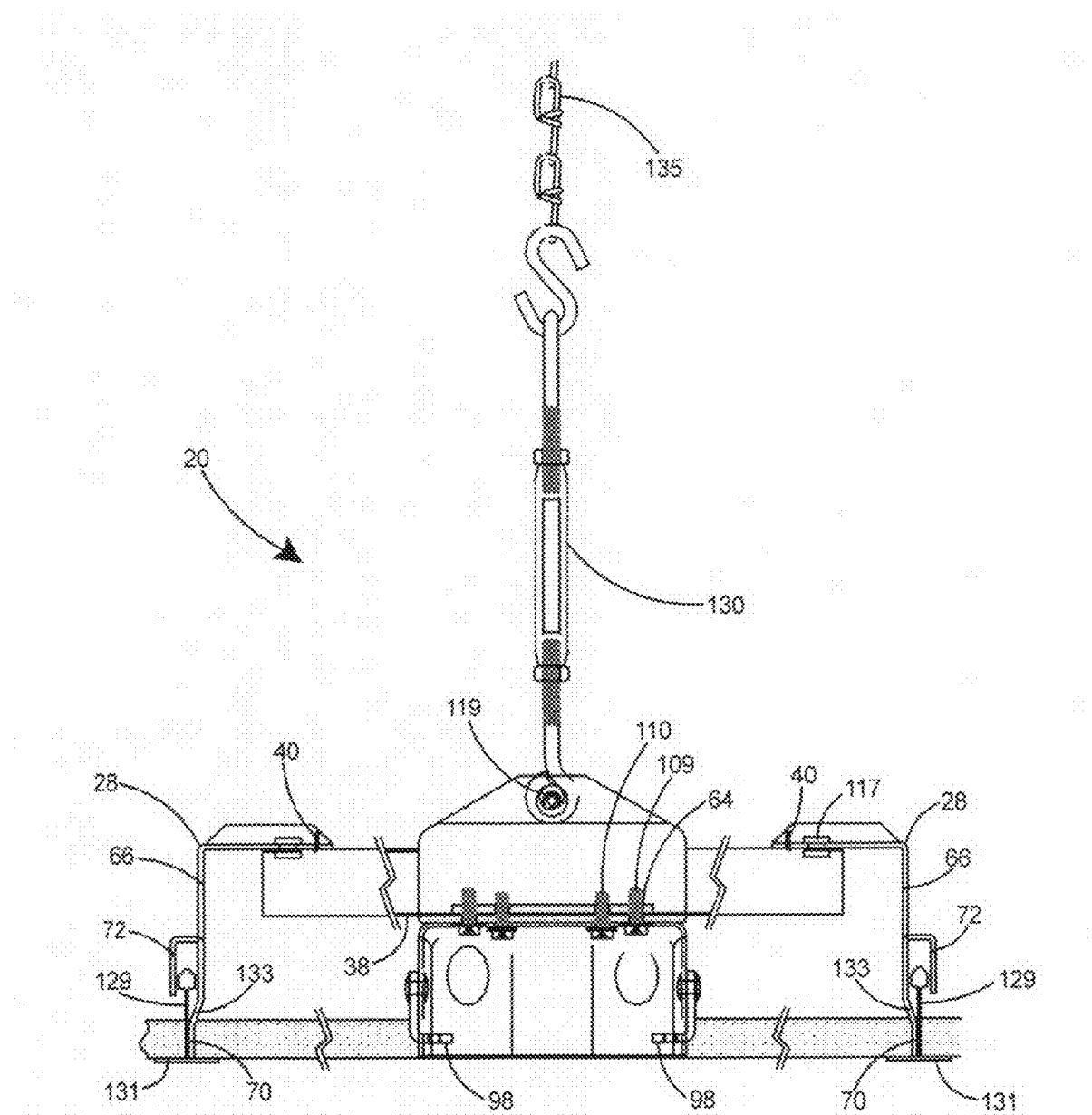
FIG. 19 is a side conceptual view of the hanger assembly of the present invention installed on the grid supports of a suspended ceiling.

For operation of the hanger assembly of the present invention, reference is made to FIG. 19. As described hereinabove, the elongated bar 22 includes a longitudinal slot 38 (see FIG. 3) along its bottom side and parallel lips 36 surround the longitudinal slot 38. In the hanger assembly 20, the bracket back plate 111 rides within the bar 22 and rests on the lips 36. Electrical box 26 is held securely to center bracket 24 by electrical box fasteners 110 thereby enabling the electrical box and center bracket to move as a unit. In the hanger assembly 20, the center bracket 24 and electrical box 26 assembly is held firmly to bar 22 by positioning fasteners 109 extending through smooth outer bores 64 (see FIG. 6) in center bracket 24 and through longitudinal slot 38 in elongated bar 22. Smooth outer bores 64 in center bracket 24 are oversize bores that are larger than the diameter of positioning fasteners 109. The installer therefore loosens positioning fasteners 109, thereby loosening the electrical box 26 and center bracket 24 assembly with respect to the bar 22, and slides the box and center bracket to the desired position with respect to the bar 22. Positioning fasteners 109 are then tightened to sandwich the lips 36 of the bar 22 between bracket back plate 111 and bottom wall 48 of center bracket 24 and thereby lock the electrical box 26 and center bracket assembly 26 with respect to the bar 22.

As shown in FIG. 19, for installation on a suspended ceiling the hanger assembly 20 is locked in the expanded configuration by bending locking tabs 40 upward until they engage notches 78 (see FIG. 1) of end piece 28. Hanger assembly 20 is then placed over the T-rails 129 of a suspended ceiling system. Legs 70 of end pieces 28 rest on the horizontal flanges 131 of the T-rails 129. Legs 70 include an outwardly bent bottom portion 133 that places pressure against the T-rails 129. The end portion of the T-rail 129 is thus held within the end plate 66 and arm 72 of each end piece 28. Turnbuckle 30 is then rotated around fastener 119 and a chain 135 or equivalent flexible support device is attached to the turnbuckle 30 and to an overhead structure to support the hanger assembly 20 and any light fixture or electrical fan attached thereto. The hanger assembly 20 of the present invention is capable of supporting loads up to 50 pounds.

Preferably, the material of construction of the one-piece elongated bar 22, center bracket 24, bracket back plate 111, electrical box 26, lugs 98, end pieces 28, and turnbuckle 30 are steel. The elongated bar 22, center bracket 24, bracket back plate 111, and lugs 98 are preferably constructed of American Iron and Steel Institute (AISI) grade 1010 steel with a galvanized coating. The electrical box 24 is preferably constructed of 0.063-inch minimum thickness AISI 1010 steel that is galvanized or plate. The turnbuckle 30 is preferably a ¼-inch by 7.75-inch eye/eye turnbuckle constructed of AISI grade 1045 galvanized steel. Preferred thickness of the various other steel components include 0.040-inch minimum thickness for the elongated bar 22, 0.10-inch minimum thickness for the center bracket 24, 0.125-inch minimum thickness for the bracket back plate 111 and the lugs 98. The end pieces 28 are preferably constructed of 14-gage steel. As shown in the compact configuration 121 in the left side of FIG. 17, the center bracket 24, which is thicker than the elongated bar 22, substantially surrounds the entire outer periphery of the elongated bar 22 thereby significantly strengthening the hanger assembly and rendering it capable of supporting a load, such as an electrical fan, of up to 50 pounds.

Having thus described the invention with reference to a preferred embodiment, it is to be understood that the invention is not so limited by the description herein but is defined as follows by the appended claims.

What is claimed is:

1. An electrical box hanger assembly reconfigurable from a compact configuration to an expanded configuration comprising:
   a tubular one-piece elongated bar including a channel therein and two ends;
   a center bracket including a tubular bottom portion with a central channel therein, two wings extending from said tubular bottom portion, said wings including axially aligned apertures therein and a gap between said wings;
   an electrical box secured to said tubular bottom portion of said center bracket, said electrical box including sidewalls and lugs secured to said sidewalls;
   said elongated bar disposed within said central channel of said center bracket;
   an end piece pivotally attached at each end of said elongated bar, said end piece including an end plate and a top plate with a notch therein;
   threaded bores in said lugs, said threaded bores for receipt of mounting fasteners for securing an electrical device to said electrical box;
   said compact configuration of said hanger assembly including said end plates of said end pieces substantially parallel with said elongated bar; and
   said expanded configuration of said hanger assembly including said end plates of said end pieces substantially perpendicular with said elongated bar.

2. The electrical box hanger assembly of claim 1 wherein said elongated bar includes a top wall;
   a bendable locking tab in said top wall of said bar near each of said ends; and said bendable locking tab is defined by a U-shaped opening in said top wall of said elongated bar.

3. The electrical box hanger assembly of claim 2 wherein said top wall of said elongated bar includes an aperture therein near each of said ends; and
a rivet in said aperture of said top wall pivotally connecting said end pieces to said elongated bar.

4. The electrical box hanger assembly of claim 1 including a bottom wall in said center bracket; and
a pair of threaded inner bores and a pair of smooth outer bores in said bottom wall of said center bracket.

5. The electrical box hanger assembly of claim 1 including a bracket back plate disposed within said channel of said elongated bar;
a pair of smooth inner bores and a pair of threaded outer bores in said bracket back plate; and
a positioning fastener connecting said electrical box to said bracket back plate, said positioning fastener capable of locking said electrical box and center bracket with respect to said elongated bar.

6. The electrical box banger assembly of claim 1 wherein each of said end pieces include
two ends;
a leg extending from each end of said end pieces; and
an arm extending from each leg.

7. The electrical box hanger assembly of claim 6 including a bore in each of said legs of said end pieces;
a bore in each of said arms of said end pieces; and
said bore in each of said legs are coaxial one of said bores in said arms.

8. The electrical box hanger assembly of claim 1 wherein said top plate of said end pieces include an aperture therein and two flanges extending there from.

9. The electrical box hanger assembly of claim 1 including a fastener storage tab on said electrical box, said fastener storage tab including a bent over portion of said sidewalls of said electrical box;
two threaded bores in said fastener storage tab; and
a mounting fastener in each of said threaded bores in said fastener storage tab, said mounting fasteners for use in said threaded bores in said lugs.

10. The electrical box hanger assembly of claim 1 including
one or more knockouts in said sidewalls of said electrical box; and
a push-in electrical fitting in one of said knockouts.

11. The electrical box hanger assembly of claim 2 including
a turnbuckle fastener extending through said axially aligned apertures in said wings; and
a turnbuckle pivotally attached to said turnbuckle fastener.

12. The electrical box hanger assembly of claim 11 wherein said compact configuration includes said turnbuckle folded against said elongated bar.

13. The electrical box hanger assembly of claim 11 wherein said expanded configuration includes said turnbuckle oriented substantially perpendicular to said elongated bar and said bendable locking tabs engaging said notches of said end pieces.

14. The electrical box hanger assembly of claim 6 wherein said legs include an outwardly bent bottom portion, said outwardly bent bottom portion of said leg adapted to place pressure against the T-rails of a suspended ceiling when secured thereto.

15. A reconfigurable electrical box hanger assembly comprising:
a tubular one-piece elongated bar including a channel therein, two ends, a top wall, a bottom wall, a longitudinal slot extending through said bottom wall of said bar, and;
a center bracket including a tubular bottom portion with a central channel therein, two wings extending from said tubular bottom portion, said wings including axially aligned apertures therein and a gap between said wings;
an electrical box secured to said tubular bottom portion of said center bracket, said electrical box including sidewalls and lugs secured to said sidewalls;
said elongated bar disposed within said central channel of said center bracket;
an end piece pivotally attached at each end of said elongated bar, said end piece including an end plate and a top plate with a notch therein;
a locking arrangement for locking said pivotal end pieces with respect to said bar;
threaded bores in said lugs, said threaded bores for receipt of mounting fasteners for securing said electrical device to said electrical box;
a compact configuration of said banger assembly including said end plates of said end pieces substantially parallel with said elongated bar; and
an expanded configuration of said hanger assembly including said end plates of said end pieces substantially perpendicular with said elongated bar and said bendable locking tabs engaging said notches of said end pieces.

16. The reconfigurable electrical box hanger assembly of claim 15 wherein said locking arrangement is a bendable tab in said top wall of said elongated bar.

17. The reconfigurable electrical box hanger assembly of claim 15 including
a bracket back plate disposed within said channel of said elongated bar; and
a positioning fastener connecting said electrical box to said bracket back plate, said positioning fastener capable of locking said electrical box and center bracket with respect to said elongated bar.

18. The reconfigurable electrical box hanger assembly of claim 15 including
a turnbuckle fastener extending through said axially aligned apertures in said wings; and
a turnbuckle pivotally attached to said turnbuckle fastener.

19. A reconfigurable electrical box hanger assembly comprising:
a tubular one-piece elongated bar including a wall, a channel, a longitudinal slot in said wall, and two ends;
a center bracket secured to said elongated bar, said center bracket including an arrangement for adjusting the position of said center bracket with respect to said bar;
an electrical box secured to said center bracket;
a turnbuckle pivotally attached to said center bracket;
an end piece pivotally attached at each end of said elongated bar;
an arrangement for locking said end pieces with respect to said bar;
said hanger assembly including a compact configuration wherein said end plates and said turnbuckle are folded substantially parallel to said elongated bar; and
said hanger assembly including an expanded configuration wherein said end plates and said turnbuckle are folded substantially perpendicular to said elongated bar and said end plates are locked in said perpendicular orientation with respect to said bar.

20. The reconfigurable electrical box hanger assembly of claim 19 wherein
said arrangement for locking said end pieces with respect to said bar includes a bendable tab in said elongated bar and a notch in said end piece; and
said arrangement for adjusting the position of said center bracket with respect to said bar includes a bracket back plate disposed within said channel of said elongated bar and a positioning fastener extending through said longitudinal slot and connecting said electrical box to said bracket back plate, said positioning fastener capable of locking said electrical box and center bracket with respect to said elongated bar.

* * * * *